United States Patent
Sato et al.

(10) Patent No.: US 10,812,001 B2
(45) Date of Patent: Oct. 20, 2020

(54) CONTROL DEVICE, CONTROL METHOD, MOTOR, AND ELECTRIC OIL PUMP

(71) Applicant: Nidec Tosok Corporation, Zama-shi, Kanagawa (JP)

(72) Inventors: Kei Sato, Zama (JP); Yuichi Hibi, Zama (JP); Yasuhiro Shirai, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/333,599

(22) PCT Filed: Sep. 25, 2017

(86) PCT No.: PCT/JP2017/034485
§ 371 (c)(1),
(2) Date: Mar. 15, 2019

(87) PCT Pub. No.: WO2018/062083
PCT Pub. Date: Apr. 5, 2018

(65) Prior Publication Data
US 2019/0214926 A1 Jul. 11, 2019

(30) Foreign Application Priority Data

Sep. 30, 2016 (JP) .................................. 2016-194656

(51) Int. Cl.
*H02P 6/10* (2006.01)
*H02K 11/215* (2016.01)
(Continued)

(52) U.S. Cl.
CPC ................ *H02P 6/10* (2013.01); *F04B 17/03* (2013.01); *F04B 43/04* (2013.01); *F04B 49/06* (2013.01);
(Continued)

(58) Field of Classification Search
CPC .......... H02P 6/10; H02K 11/215; F04B 53/16
See application file for complete search history.

(56) References Cited

U.S. PATENT DOCUMENTS 7,323,838 B2 1/2008 Ma et al.
8,653,870 B2 2/2014 Ogawa
(Continued)

FOREIGN PATENT DOCUMENTS

JP 4-368475 A 12/1992
JP 7-75369 A 3/1995
(Continued)

OTHER PUBLICATIONS

Official Communication issued in International Patent Application No. PCT/JP2017/034485, dated Dec. 19, 2017.

*Primary Examiner* — Cortez M Cook
(74) *Attorney, Agent, or Firm* — Keating & Bennett, LLP

(57) ABSTRACT

A control device to control a motor includes a stator including a coil, a rotor including a permanent magnet, a detector that detects a rotational position of the rotor at every predetermined angle and outputs a position signal indicating the detected rotational position, and a controller that receives the position signal output by the detector and adjusts a duty ratio of a driving signal of the rotor by a pulse width modulation scheme based on the received position signal to control rotation of the rotor. The controller raises the duty ratio from a first duty ratio, starting from a point in time at which the position signal is received, and returns the raised duty ratio to the first duty ratio when a next position signal has been received.

20 Claims, 6 Drawing Sheets

(51) Int. Cl.

| | | |
|---|---|---|
| *F04B 53/16* | (2006.01) | |
| *H02P 6/16* | (2016.01) | |
| *F04B 43/04* | (2006.01) | |
| *H02K 29/08* | (2006.01) | |
| *F04C 2/10* | (2006.01) | |
| *H02P 6/15* | (2016.01) | |
| *H02K 7/14* | (2006.01) | |
| *H02P 23/03* | (2006.01) | |
| *F04B 49/06* | (2006.01) | |
| *H02K 5/12* | (2006.01) | |
| *F04B 17/03* | (2006.01) | |
| *H02K 24/00* | (2006.01) | |
| *H02K 29/10* | (2006.01) | |
| *H02K 21/16* | (2006.01) | |
| *H02K 5/22* | (2006.01) | |

(52) U.S. Cl.
CPC ............... *F04C 2/10* (2013.01); *H02K 5/12* (2013.01); *H02K 7/14* (2013.01); *H02K 11/215* (2016.01); *H02K 29/08* (2013.01); *H02P 6/15* (2016.02); *H02P 6/16* (2013.01); *H02P 23/03* (2013.01); *F04B 53/16* (2013.01); *H02K 5/225* (2013.01); *H02K 21/16* (2013.01); *H02K 24/00* (2013.01); *H02K 29/10* (2013.01); *H02P 2207/05* (2013.01); *H02P 2207/055* (2013.01)

(56) References Cited

U.S. PATENT DOCUMENTS

| | | | | |
|---|---|---|---|---|
| 2008/0129237 | A1* | 6/2008 | Atarashi | ............ H02P 6/00 |
| | | | | 318/492 |
| 2013/0069572 | A1* | 3/2013 | Maekawa | ............ H02P 6/18 |
| | | | | 318/400.14 |
| 2015/0028780 | A1* | 1/2015 | Hatakeyama | ............ H02P 6/24 |
| | | | | 318/400.1 |
| 2016/0211790 | A1* | 7/2016 | Ajima | ............ B60L 15/007 |
| 2016/0233804 | A1* | 8/2016 | Furutani | ............ H02P 6/16 |

FOREIGN PATENT DOCUMENTS

| | | |
|---|---|---|
| JP | 2003-227468 A | 8/2003 |
| JP | 2007-28891 A | 2/2007 |
| JP | 2013-66266 A | 4/2013 |
| JP | 2014-9655 A | 1/2014 |

\* cited by examiner

CONTROL DEVICE, CONTROL METHOD, MOTOR, AND ELECTRIC OIL PUMP

TECHNICAL FIELD

The present disclosure relates to a control device, a control method, a motor, and an electric oil pump.

BACKGROUND ART

A technology for realizing high responsiveness of an apparatus such as an electric oil pump that is driven by a motor by rotating the motor at a lower speed when the apparatus is not used than when the apparatus is used without stopping the motor is known. Japanese Patent Laid-Open No. H4-368475 discloses a control device that maintains low-speed rotation of an electric motor by returning the rotational speed of the electric motor to the original speed when the rotational speed of the electric motor has abruptly decreased.

However, the control device of Japanese Patent Laid-Open No. H4-368475 needs an abrupt change in the rotational speed for control. Depending on the rotational speed of the motor that is being controlled to rotate at a low speed, the rotation of the motor may be stopped due to an abrupt change in the rotational speed, and therefore it may be difficult for the control device of Japanese Patent Laid-Open No. H4-368475 to maintain low-speed rotation of the motor.

SUMMARY OF THE DISCLOSURE

An example embodiment of the present disclosure provides, for example, a control device that maintains low-speed rotation of a motor.

A first example embodiment of the present application is a control device to control a motor including a stator including a coil and a rotor including a permanent magnet, the control device including a detector to detect a rotational position of the rotor at every predetermined angle and to output a position signal indicating the detected rotational position and a controller to receive the position signal output by the detector and to adjust a duty ratio of a driving signal of the rotor by a pulse width modulation scheme based on the received position signal to control rotation of the rotor, wherein the controller is configured or programmed to raise the duty ratio from a first duty ratio, starting from a point in time at which the position signal is received, and to return the raised duty ratio to the first duty ratio when a next position signal has been received.

According to an example embodiment of the present application, it is possible to provide a control device that maintains low-speed rotation of the motor.

The above and other elements, features, steps, characteristics and advantages of the present disclosure will become more apparent from the following detailed description of example embodiments with reference to the attached drawings.

DESCRIPTION OF EXAMPLE EMBODIMENTS

Figure 1:
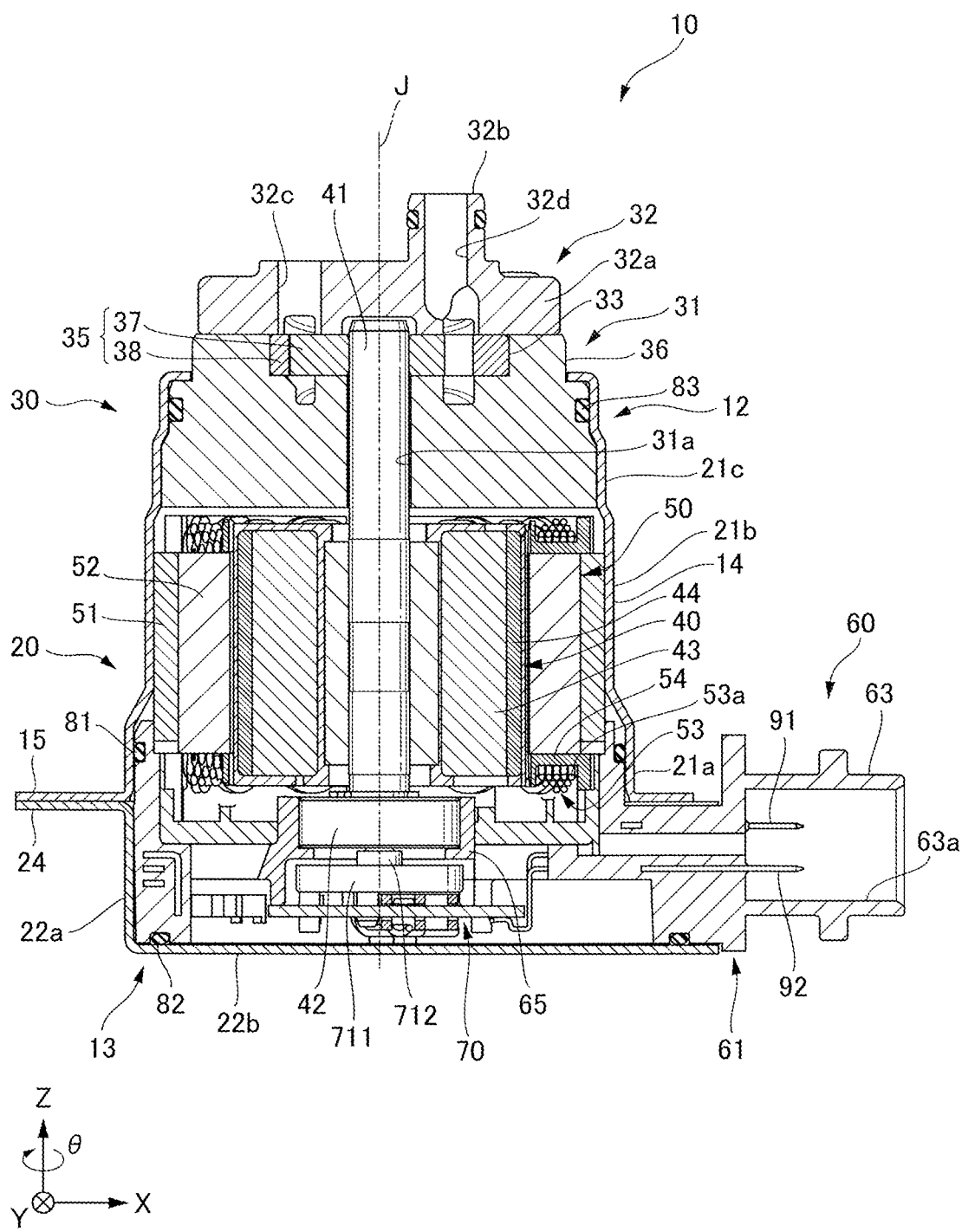
FIG. 1 is a diagram showing a configuration of an electric oil pump.

Hereinafter, example embodiments for carrying out the present disclosure will be described with reference to the drawings or the like. The scope of the present disclosure is not limited to the following example embodiments and can be arbitrarily changed within the technical idea of the present disclosure. Further, in the following drawings, scales, numbers, and the like in structures may sometimes be made different from those of the actual structures to make their configurations easy to understand.

In the drawings, an XYZ coordinate system is appropriately shown as a three-dimensional orthogonal coordinate system. In the XYZ coordinate system, the Z axis direction is parallel to an axial direction (one direction) of a central axis J shown in FIG. 1. The X axis direction is parallel to the longitudinal direction of a bus bar assembly 60 shown in FIG. 1, that is, the left and right direction in FIG. 1. The Y axis direction is a direction parallel to the width direction of the bus bar assembly 60, that is, a direction orthogonal to both the X axis direction and the Z axis direction.

In the following description, the positive side in the Z axis direction (the +Z side) is referred to as a "front side" and the negative side in the Z axis direction (the −Z side) is referred to as a "rear side." It is to be noted that the rear side and the front side are terms simply used for explanation and do not limit the actual positional relationship or direction. Unless otherwise stated, a direction parallel to the central axis J (Z axis direction) is simply referred to as an "axial direction," a radial direction with respect to the central axis J is simply referred to as a "radial direction," and a circumferential direction with respect to the axis of the central axis J, that is, a circumferential direction around the axis of the central axis J (θ direction), is simply referred to as a "circumferential direction."

In the present specification, it is to be noted that the term "extending in the axial direction" includes not only the case of strictly extending in the axial direction (in the Z axis direction) but also the case of extending in a direction inclined with a range of less than 45° with respect to the axial direction. Also, in the present specification, the term "extending in the radial direction" includes not only the case of strictly extending in the radial direction, that is, in a direction perpendicular to the axial direction (the Z axis direction), but also the case of extending in a direction inclined with a range of less than 45° with respect to the radial direction.

FIRST EXAMPLE EMBODIMENT

<Electric Oil Pump>

FIG. 1 is a diagram showing a configuration of an electric oil pump 10 according to the present example embodiment. The electric oil pump 10 includes a shaft 41, a motor unit 20, a pump unit 30, a housing 12, and a control device 70. The shaft 41 rotates around the central axis J extending in the axial direction. The motor unit 20 and the pump unit 30 are provided side by side along the axial direction.

<Motor>

The motor unit 20 includes a cover 13, a rotor 40, a stator 50, a bearing 42, a bus bar assembly 60, a front side O-ring 81, and a rear side O-ring 82.

The rotor 40 is fixed to an outer peripheral surface of the shaft 41. The stator 50 is positioned radially outside the rotor 40. That is, the motor unit 20 is an inner rotor type motor. The bearing 42 rotatably supports the shaft 41. The bearing 42 is held by the bus bar assembly 60. The bus bar assembly 60 is connected to an external power supply and supplies power to the stator 50.

<Cover>

The material of the cover 13 is, for example, a metal. The cover 13 is fixed to the rear side (−Z side) of the housing 12 and covers at least a part of the rear side (−Z side) of the bus bar assembly 60. The cover 13 has a cylindrical portion 22a, a lid portion 22b, and a flange portion 24. The cylindrical portion 22a opens to the front side (+Z side). The lid portion 22b is connected to a rear-side end portion of the cylindrical portion 22a. In the present example embodiment, the lid portion 22b has a flat plate shape. The flange portion 24 extends radially outward from a front-side end portion of the cylindrical portion 22a. The housing 12 and the cover 13 are joined together with the flange portion 15 of the housing 12 and the flange portion 24 of the cover 13 overlapping each other.

<Rotor>

The rotor 40 has a rotor core 43 and a rotor magnet 44. The rotor core 43 surrounds the shaft 41 around the axis (in the θ direction) and is fixed to the shaft 41. The rotor magnet 44 is fixed to an outer surface around the axis of the rotor core 43. The rotor core 43 and the rotor magnet 44 rotate integrally with the shaft 41. A permanent magnet is used as the rotor magnet 44. In the present example embodiment, in particular, a rare earth magnet having strong attractive and repulsive forces (such as a neodymium magnet) is used.

<Stator>

The stator 50 surrounds the rotor 40 around the axis (in the θ direction) and rotates the rotor 40 around the central axis J. The stator 50 includes a core back portion 51, tooth portions 52, a coil 53, and a bobbin (insulator) 54.

Figure 2:
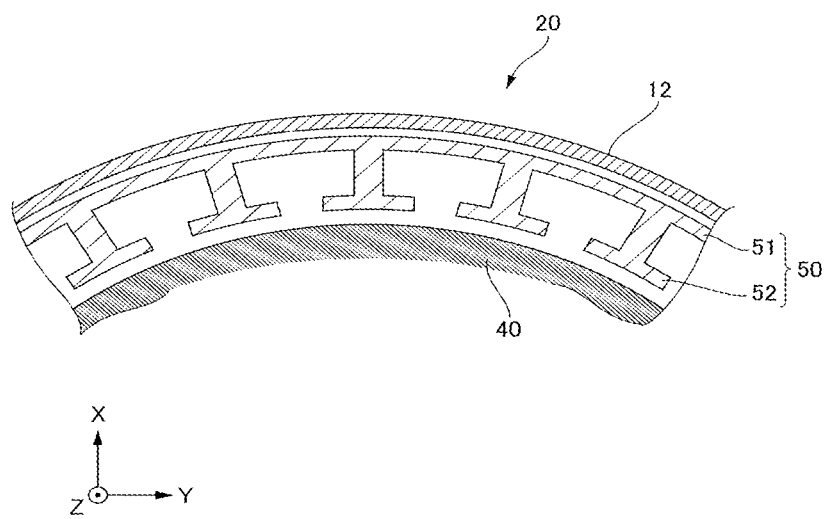
FIG. 2 is a diagram of a cross section of tooth portions as viewed from a Z axis direction.

The core back portion 51 has a cylindrical shape concentric with the shaft 41. FIG. 2 is a diagram of a cross section of the tooth portions 52 as viewed from the Z axis direction. The tooth portions 52 extend from the inner surface of the core back portion 51 toward the shaft 41. The plurality of tooth portions 52 are provided and arranged at equal intervals in the circumferential direction on the inner surface of the core back portion 51. The coil 53 is formed by winding a conductive wire 53a. The coil 53 is provided on the bobbin 54. The bobbin 54 is attached to each tooth portion 52.

<Bearing>

The bearing 42 is disposed on the rear side (−Z side) of the stator 50. The bearing 42 is held by a bearing holding portion 65 of a bus bar holder 61 which will be described later. The bearing 42 supports the shaft 41. The configuration of the bearing 42 is not particularly limited and any well-known bearing may be used.

<Bus Bar Assembly>

The bus bar assembly 60 has a bus bar 91 electrically connected to the stator 50 and the bus bar holder 61 holding the bus bar. The bus bar holder 61 has an opening portion on the rear side. The lid portion 22b of the cover 13 closes the rear side opening portion of the bus bar holder 61. A front side surface of the lid portion 22b of the cover 13 is in contact with the entire circumference of the rear side O-ring 82. Thus, the cover 13 is in contact with a rear surface of a main body portion on the rear side of the bus bar holder 61 via the rear side O-ring 82 over the entire periphery of the opening portion of the bus bar holder 61.

The bus bar holder 61 has a connector portion 63. The motor unit 20 and the external power supply are connected via the connector portion 63. The connected external power supply is electrically connected to the bus bar 91 and a wiring member 92 that project from the bottom surface of a power supply opening portion 63a of the connector portion 63. Thus, a driving current is supplied to the coil 53 of the stator 50 via the bus bar 91 and the wiring member 92.

<Pump Unit>

The pump unit 30 of the present example embodiment is a gear pump that sucks and discharges oil by changing the internal volume by the rotational motion of a gear. The gear pump is a volumetric displacement pump, and a diaphragm pump which changes the internal volume by the reciprocating motion of a diaphragm can also be used. By using such a volumetric pump, it is possible to suck and discharge oil to achieve high responsiveness of the electric oil pump even when the motor rotates at a low speed.

The pump unit 30 is positioned on one side in the axial direction of the motor unit 20, specifically, on the front side (+Z axis side). The pump unit 30 is driven by the motor unit 20 via the shaft 41. The pump unit 30 has a pump body 31, a pump cover 32, and a pump rotor 35.

The pump body 31 is fixed in the housing 12 on the front side of the motor unit 20. An outer peripheral surface of the pump body 31 is in radial contact with an inner peripheral surface of the housing 12 via a pump unit O-ring 83. The pump body 31 has a pump chamber 33 which accommodates the pump rotor 35 and which is recessed from the front side (+Z side) surface to the rear side (the −Z side). The pump chamber 33 has a circular shape when viewed in the axial direction.

The pump body 31 has a through hole 31a which is open at both axial ends such that the shaft 41 is passed therethrough and whose front side opening opens into the pump chamber 33. The rear side opening of the through hole 31a opens to the motor unit 20 side. The through hole 31a functions as a bearing member that rotatably supports the shaft 41.

The pump body 31 has an exposed portion 36 that is positioned in front of the housing 12 and exposed to the outside of the housing 12. The exposed portion 36 is a portion of a front-side end portion of the pump body 31. The exposed portion 36 has a cylindrical shape extending in the axial direction. The exposed portion 36 radially overlaps the pump chamber 33.

The pump cover 32 is attached to the front side of the pump body 31. The pump cover 32 has a pump cover body 32a, a pump discharge cylinder portion 32b including a discharge port 32d, and a suction port 32c. The pump cover body 32a has a disk shape expanding in the radial direction. The pump cover body 32a closes the front side opening of the pump chamber 33. The pump discharge cylinder portion 32b has a cylindrical shape extending in the axial direction. The pump discharge cylinder portion 32b has the discharge port 32d that is open at both axial ends. The pump discharge cylinder portion 32b extends from the pump cover body 32a to the front side. The suction port 32c opens to the front-side surface of the pump cover 32. The discharge port 32d and the suction port 32c communicate with the pump chamber 33 such that oil can be sucked into the pump chamber 33 and discharged from the pump chamber 33. When the shaft 41 rotates in one circumferential direction (in the −θ direction), oil is sucked into the pump chamber 33 from the suction port 32c. The oil sucked into the pump chamber 33 is sent by the pump rotor 35 and discharged to the discharge port 32d.

The pump rotor 35 has an inner rotor 37 and an outer rotor 38. The inner rotor 37 is attached to a front side end portion of the shaft 41. The outer rotor 38 is disposed such that it surrounds the radially outer side of the inner rotor 37. The inner rotor 37 is annular and is a gear having teeth on the radially outer side surface.

The inner rotor 37 and the outer rotor 38 engage with each other such that the outer rotor 38 rotates as the inner rotor 37 rotates. By rotating the inner rotor 37 and the outer rotor 38, oil sucked into the pump chamber 33 from the suction port 32c can be sent to the discharge port 32d. That is, the rotation of the shaft 41 causes the pump rotor 35 to rotate. In other words, the motor unit 20 and the pump unit 30 have the same rotation axis.

<Housing>

The housing 12 has a multi-stage cylindrical shape which is open at both ends with respect to the central axis J. The material of the housing 12 is, for example, a metal. The housing 12 holds the motor unit 20 and the pump unit 30. The housing 12 has a tubular portion 14 and a flange portion 15. The tubular portion 14 has a cylindrical shape centered at the central axis J. The tubular portion 14 has a bus bar assembly inserting portion 21a, a stator holding portion 21b, and a pump body holding portion 21c which are sequentially arranged along the axial direction (the Z axis direction) from the rear side (the −Z side) to the front side (the +Z side). The flange portion 15 extends radially outward from a rear side end portion of the tubular portion 14.

A rear side end portion of the bus bar assembly inserting portion 21a is coupled to the cylindrical portion 22a of the cover 13 via the flange portion 24 of the cover 13 and the flange portion 15 of the housing 12. The bus bar assembly inserting portion 21a surrounds the front side (+Z side) end portion of the bus bar assembly 60 from the outer side in the radial direction of the central axis J. The bus bar assembly inserting portion 21a, the stator holding portion 21b, and the pump body holding portion 21c have concentric cylindrical shapes and are in a descending order of diameter.

The front side end portion of the bus bar assembly 60 is positioned inside the housing 12. An outer side surface of the stator 50, that is, an outer side surface of the core back portion 51, is in contact with an inner side surface of the stator holding portion 21b. Thereby, the stator 50 is held in the housing 12. An outer peripheral surface of the pump body 31 is fixed to an inner peripheral surface of the pump body holding portion 21c.

<Control Device>

Figure 3:
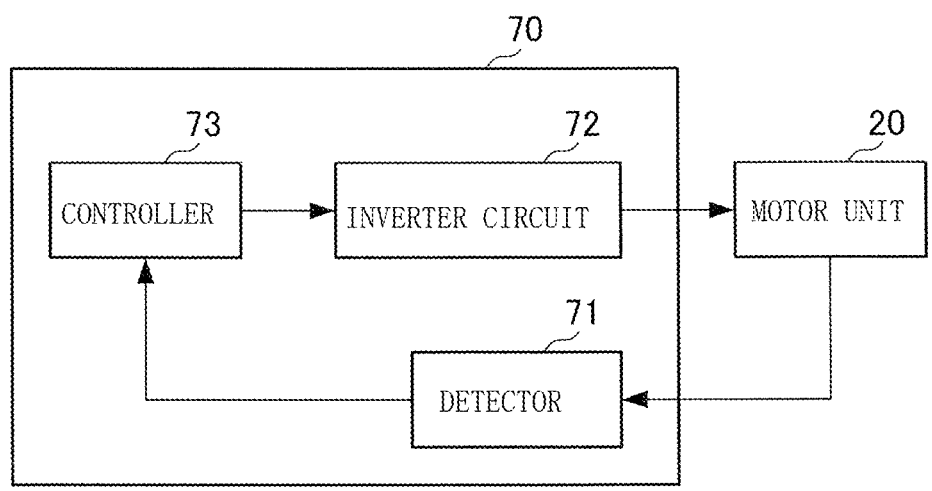
FIG. 3 is a block diagram showing a relationship between elements included in a control device and a relationship between the control device and a motor unit.

The control device 70 is disposed between the bearing 42 and the cover 13 and controls the driving of the motor unit 20. The control device 70 includes a detector 71, an inverter circuit 72, and a controller 73. FIG. 3 is a block diagram showing a relationship between elements included in the control device 70 and a relationship between the control device 70 and the motor unit 20.

The inverter circuit 72 outputs a motor driving voltage. A magnetic sensor such as a Hall element or a magnetoresistive element, an optical encoder, or a resolver can be used as the detector 71. In the present example embodiment, a Hall element which is a magnetic sensor is used. The detector 71 has a sensor magnet 711 and a magnet holding portion 712.

The sensor magnet 711 is annular with N poles and S poles alternately arranged in the circumferential direction. The sensor magnet holding portion 712 is located by fitting its center hole to a small diameter portion of the rear side (+Z side) end portion of the shaft 41. The sensor magnet holding portion 712 is rotatable together with the shaft 41. The sensor magnet 711 is disposed on an outer peripheral surface of the sensor magnet holding portion 712.

The detector 71 detects a change in the magnetic flux of the sensor magnet 711 to detect the rotational position of the rotor 40 at every predetermined angle and outputs a position signal indicating the detected rotational position to the controller 73. In the present example embodiment, the output position signal is a set of position signals including a plurality of signals. For example, when magnetoresistance elements are used as the detector 71, one position signal is output at every predetermined angle.

For example, the controller 73 includes a storage unit, and receives the position signal output from the detector 71 and adjusts the duty ratio of the driving signal of the rotor by a pulse width modulation scheme (PWM scheme) on the basis of the received position signal. The controller 73 outputs the adjusted driving signal of the rotor to the inverter circuit 72. The inverter circuit 72 outputs a motor driving voltage on the basis of the driving signal of the rotor from the controller 73. A driving current based on the driving voltage from the inverter circuit 72 is supplied to the coil 53. The supply of the driving current to the coil 53 generates a magnetic field, which rotates the rotor 40. In this way, the motor unit 20 obtains a rotational driving force. The driving current is supplied to the coil 53 of the stator 50 via the bus bar 91 and the wiring member 92.

When magnetic sensors are used as the detector 71, the number of times n that the detector 71 outputs a position signal during one rotation of the rotor 40 is the number of the magnetic sensors multiplied by the number of magnetic poles detected by the magnetic sensors. Here, the number of magnetic poles detected by the magnetic sensors may be greater than the number of magnetic poles of the permanent magnet of the rotor 40. Further, it is preferable that the number of times n be equal to or greater than the least common multiple of the number of magnetic poles of the permanent magnet of the rotor 40 and the number of the tooth portions 52 (the number of teeth) of the stator 50. By setting the number of times n equal to or greater than the least common multiple, it is possible to output a rotation signal at a period shorter than the period of the cogging torque determined from the number of magnetic poles of the permanent magnet of the rotor 40 and the number of teeth of the stator 50. Thus, the controller 73 can give the rotor 40 a rotational force that overcomes the cogging torque before the rotor 40 stops due to the influence of the cogging torque. Even when an optical encoder or resolver is used as the detector 71, it is preferable that the number of times n be equal to or greater than the least common multiple of the number of magnetic poles of the permanent magnet of the rotor 40 and the number of teeth of the stator 50.

<Adjustment Process>

Figure 4:
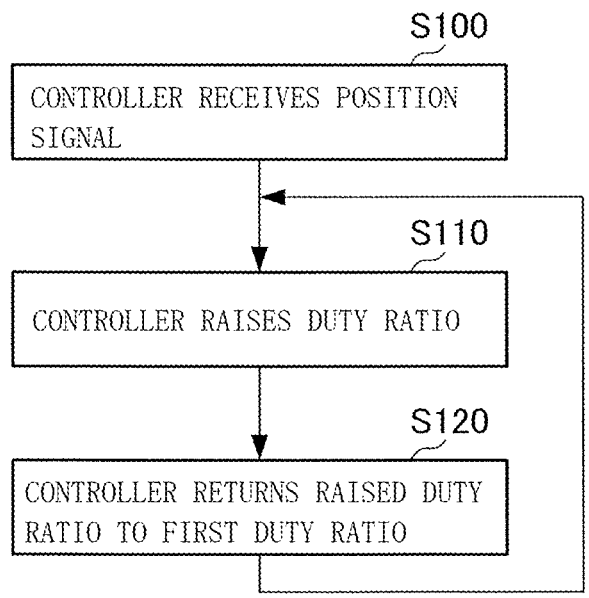
FIG. 4 is a flowchart showing a process of adjusting a driving signal of a rotor according to a first example embodiment of the present disclosure.
Figure 5:
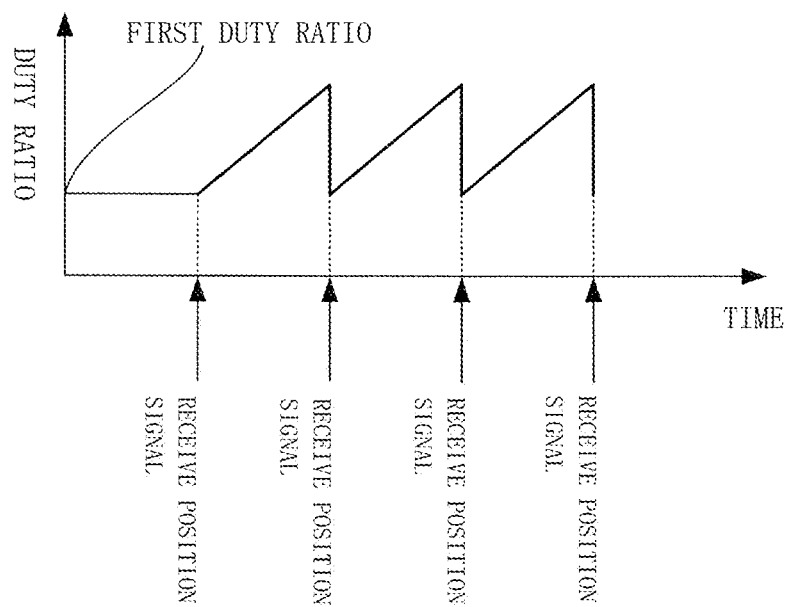
FIG. 5 is a graph showing a duty ratio of the driving signal of the rotor according to the first example embodiment of the present disclosure.

FIG. 4 is a flowchart showing a process of adjusting the driving signal of the rotor which is performed by the controller 73 included in the control device 70 of the motor unit 20 that drives the electric oil pump 10. FIG. 5 is a graph showing the duty ratio of the driving signal of the rotor 40 that the controller 73 changes by PWM control when controlling the motor unit 20 according to the flowchart of FIG. 4. The horizontal axis represents time and the vertical axis represents the duty ratio.

In step S100, the controller 73 receives a position signal from the detector 71. In step S110, the controller 73 raises the duty ratio from a first duty ratio shown in FIG. 5. In step S120, the controller 73 returns the duty ratio raised in step S110 to the first duty ratio at the timing of receiving a next position signal. After step S120, the process returns to step S110 and the flow is repeated. That is, every time a position signal is received, the controller 73 repeats the raising of the duty ratio or the clearing of the increase of the duty ratio. Here, it is preferable that a period of time that elapses until the duty ratio returns to the first duty ratio since the controller receives the next position signal in step S120 be, for example, within 20 µs.

According to the adjustment process, the controller 73 raises the duty ratio until a next position signal is received after receiving a position signal to increase the voltage to be supplied to the coil 53. Thereby, the control device 70 can give the rotor 40 a rotational force that overcomes the cogging torque or an external load before the rotation stops due to the influence of the cogging torque or the external load. Further, after raising the duty ratio, the controller 73 returns the duty ratio to the original value upon receiving a next position signal. Thus, it is possible to maintain low-speed rotation that realizes high responsiveness of the apparatus without excessively increasing the rotation rate of the rotor 40.

By adjusting the duty ratio like a waveform shown in FIG. 5, the controller 73 can maintain low-speed rotation without excessively increasing the rotation rate of the rotor 40. The features of the adjusted waveform are described as follows. First, the controller 73 gradually raises the duty ratio from the first duty ratio. Thereby, the controller 73 prevents the rotation rate of the rotor 40 from being excessively increased. Next, each varying waveform of the rise and fall of the duty ratio has a maximum value at a point in time that is closer to when the raised duty ratio returns to the first duty ratio than to when the duty ratio begins to be raised from the first duty ratio. That is, the controller 73 abruptly lowers the raised duty ratio to the first duty ratio. The adjusted waveform is a sawtooth waveform including a plurality of varying waveforms, each having a pair of a rise and a fall. That is, the controller 73 repeats the gradual raising of the duty ratio and abrupt returning to the original a plurality of times. Repetition of rising and abrupt falling of the duty ratio and then rising and abrupt falling of the duty ratio a plurality of times is effective for maintaining the low-speed rotation of the rotor 40. According to the present example embodiment, it is possible to provide a control device that maintains low-speed rotation of the motor unit. With the control device of the present example embodiment, it is also possible to provide an electric oil pump which realizes high responsiveness by driving the pump unit at a low rotational speed in advance.

SECOND EXAMPLE EMBODIMENT

In the present example embodiment, unlike the first example embodiment, the control device 70 further includes a calculator. The timing at which the duty ratio is raised by the controller 73 is determined on the basis of a period that the calculator calculates on the basis of a predetermined rotation rate of the rotor 40. According to the present example embodiment, the rotation rate of the rotor 40 can be maintained more accurately than in the first example embodiment.

Figure 6:
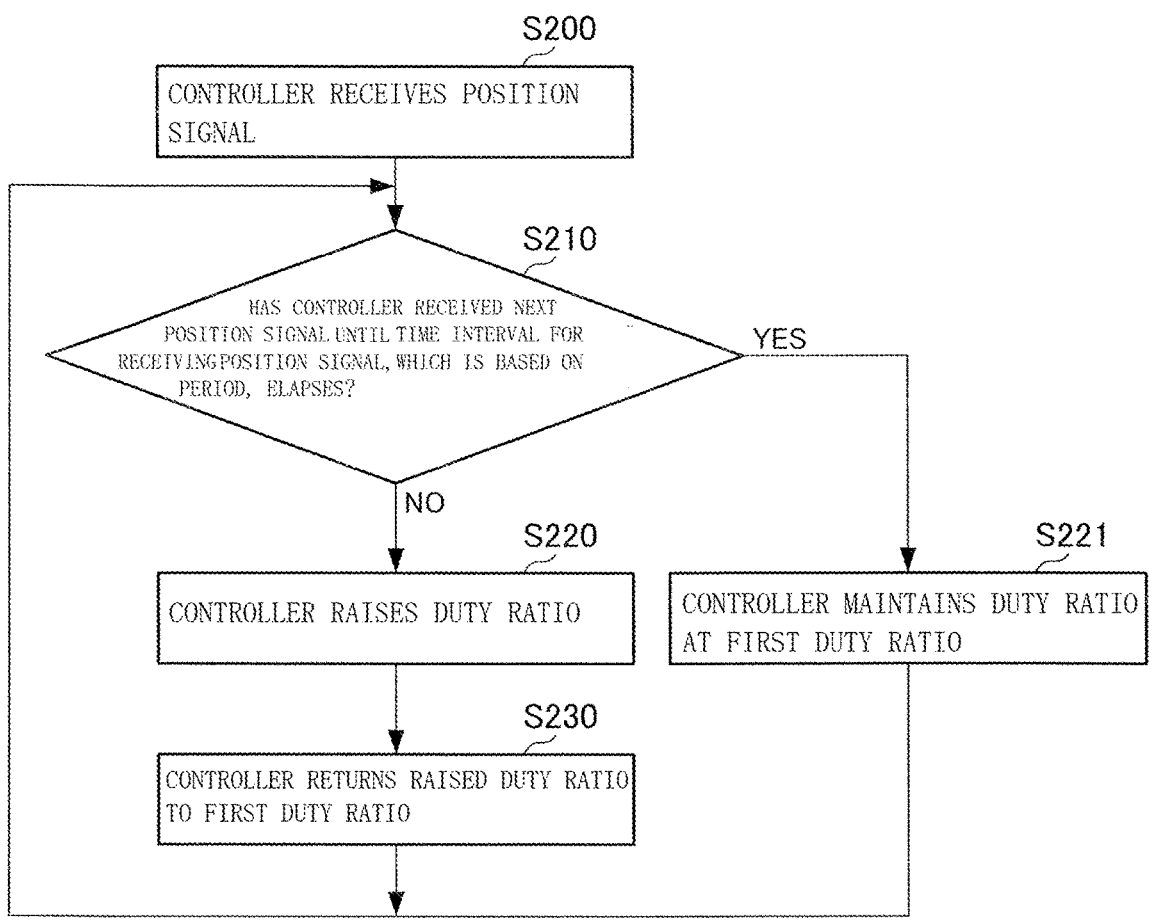
FIG. 6 is a flowchart showing a process of adjusting a driving signal of a rotor according to a second example embodiment of the present disclosure.
Figure 7:
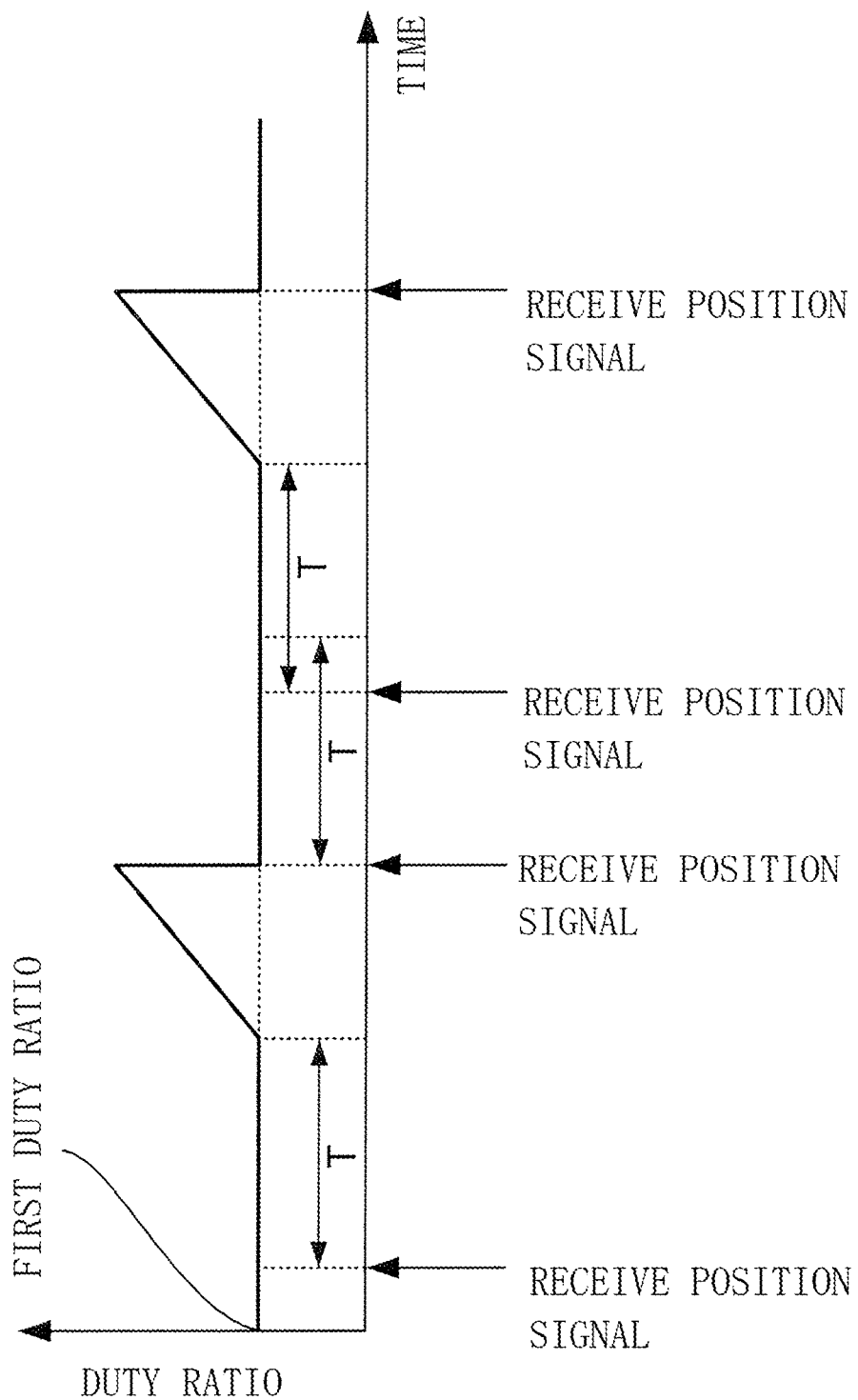
FIG. 7 is a graph showing a duty ratio of the driving signal of the rotor according to the second example embodiment of the present disclosure.

FIG. 6 is a flowchart showing a process of adjusting the driving signal of the rotor 40 which is performed by the controller 73 included in the control device 70 of the motor unit 20 that drives the electric oil pump 10. FIG. 7 is a graph showing the duty ratio of the driving signal of the rotor that the controller changes by PWM control when controlling the motor unit 20 according to the flowchart of FIG. 6. The horizontal axis represents time and the vertical axis represents the duty ratio.

In step S200, the controller 73 receives a position signal from the detector 71. In step S210, the controller 73 determines whether or not a next position signal has been received until a time interval T for receiving a position signal, which is based on the period that the calculator has calculated from the predetermined rotation rate of the rotor 40, elapses.

If the controller 73 determines in step S210 that no next position signal has been received, the controller 73 raises the duty ratio from the first duty ratio shown in FIG. 7 in step S220. In step S230, the controller 73 returns the raised duty ratio to the first duty ratio upon receiving a position signal.

If the controller 73 determines in step S210 that a next position signal has been received, the controller 73 maintains the duty ratio at the first duty ratio in step S221. After step S230 or step S221, the process returns to step S210 and the flow is repeated. The predetermined rotation rate of the rotor is a rotation rate at which the rotation of the rotor 40 is not stopped due to the influence of the cogging torque when the electric oil pump 10 is not used and is set to a rotation rate lower than that when the electric oil pump 10 is used. In the present example embodiment, the predetermined rotation rate is set to 100 rpm.

According to the above adjustment process, the controller 73 determines whether or not the rotation rate of the rotor 40 is lower than the predetermined rotation rate from the period obtained from the predetermined rotation rate and raises the duty ratio to increase the voltage to be supplied to the coil upon determining that the rotation rate is lower. Thereby, the control device 70 can give the rotor 40 a rotational force that overcomes the cogging torque or an external load at the time of low-speed rotation that is affected by the cogging torque or the external load.

On the other hand, the controller 73 does not raise the duty ratio upon determining that the rotation rate of the rotor 40 is not lower than the predetermined rotation rate. Thereby, it is possible to prevent the rotation rate of the rotor 40 from being excessively increased. Further, after raising the duty ratio, the controller 73 returns the duty ratio to the original value upon receiving a next position signal. Thus, it is possible to maintain the rotation rate of the rotor 40 at 100 rpm which is the predetermined rotation rate in the present example embodiment, without excessively increasing the rotation rate of the rotor 40.

By adjusting the duty ratio like a waveform shown in FIG. 7, the controller can maintain low-speed rotation without excessively increasing the rotation rate of the rotor 40. Among the features of the adjusted waveform, a feature different from that of the first example embodiment is that the peak value of the varying waveform is not constant and becomes higher as the timing at which the controller 73 receives a position signal is delayed.

The delay of the reception timing of a position signal indicates that the rotation rate of the rotor 40 gradually decreases due to the influence of the cogging torque or the like. That is, the duty ratio needs to be further raised as the reception timing is delayed. In the present example embodiment, if no next position signal is received in a predetermined period after a position signal is received, the controller 73 raises the duty ratio until a next position signal is received. Accordingly, the duty ratio becomes higher as the reception timing of the next position signal is delayed. Thus, the controller 73 can perform control to raise the duty ratio according to the decrease in the rotation rate of the rotor.

Figure 8:
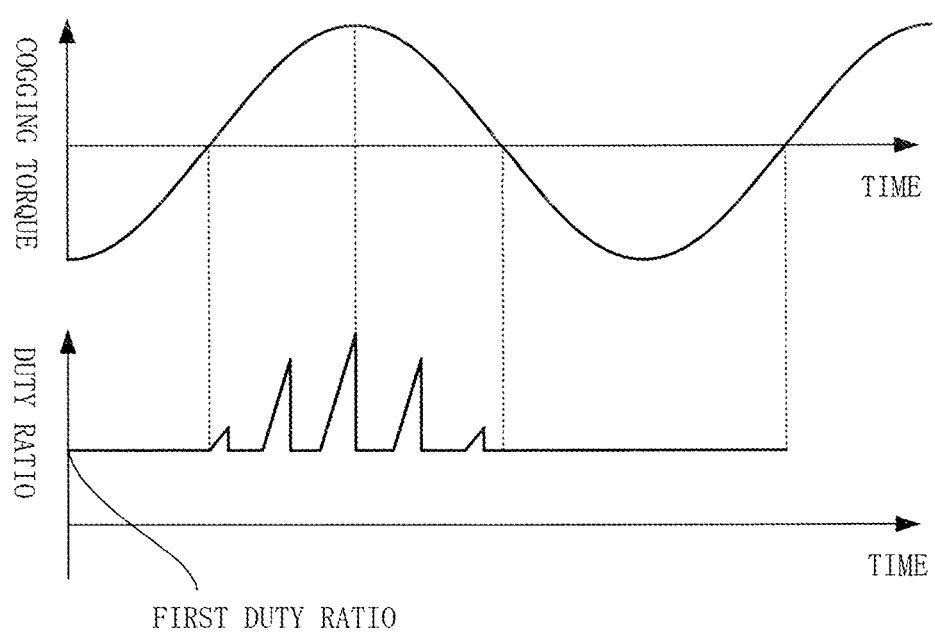
FIG. 8 is a diagram showing a correspondence relationship between an adjusted waveform of a duty ratio and a period of a cogging torque.

FIG. 8 is a diagram showing the correspondence between the waveform of the duty ratio adjusted by the controller 73 and the period of the cogging torque. The horizontal axis represents time and the vertical axis represents the magnitude of the cogging torque or the magnitude of the duty ratio.

As shown in FIG. 8, the cogging torque periodically changes. A positive cogging torque indicates the cogging torque acting in a direction to slow down the rotation of the rotor 40 and a negative cogging torque indicates the cogging torque acting in a direction to speed up the rotation of the rotor 40. The timing at which the controller receives a position signal is delayed the most at a point in time at which the positive cogging torque peaks. That is, the rotation rate of the rotor 40 is the lowest. In the present example embodiment, it is possible to perform control to raise the duty ratio according to the decrease in the rotation rate of the rotor 40. Accordingly, as shown in FIG. 8, a point in time at which the peak value of the adjusted waveform of the duty ratio is the greatest coincides with a point in time at which the positive cogging torque peaks.

On the other hand, the duty ratio does not vary within a range in which the cogging torque is negative. It is to be noted that the point in time at which the peak value of the adjusted waveform of the duty ratio is the greatest does not need to completely coincide with the point in time at which the positive cogging torque peaks. When the adjusted waveform has a plurality of peak values, it is sufficient that a point in time corresponding to the greatest of the peak values be near a point in time at which the positive cogging torque peaks.

According to the present example embodiment, it is possible to provide a control device that maintains low-speed rotation of the motor, similar to the first example embodiment. It is also possible to provide an electric oil pump which realizes high responsiveness by driving the pump unit at a low rotational speed in advance.

It is to be noted that the type of the motor is not limited to the inner rotor type of the above example embodiment. For example, the motor may be an outer rotor type motor in which the stator 50 is positioned radially inside the rotor 40 or may be an axial gap type motor in which the stator 50 and the rotor 40 are arranged in the axial direction of the motor.

Although example embodiments of the present disclosure have been described above, the present disclosure is not limited to these example embodiments and various modifications and changes are possible within the scope of the gist of the present disclosure.

This application claims priority based on Japanese Patent Application No. 2016-194686 filed on Sep. 30, 2016, the entire content of which is incorporated herein by reference.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device for controlling a motor including a stator that includes a coil and a rotor including a permanent magnet, the control device comprising:
a detector to detect a rotational position of the rotor at every predetermined angle and to output a position signal indicating the detected rotational position; and
a controller to receive the position signal output by the detector and to adjust a duty ratio of a driving signal of the rotor by a pulse width modulation scheme based on the received position signal to control rotation of the rotor; wherein
the controller is configured or programmed to raise the duty ratio from a first duty ratio, starting from a point in time at which the position signal is received, and to return the raised duty ratio to the first duty ratio starting immediately after a next position signal has been received.

2. A control device for controlling a motor including a stator that includes a coil and a rotor including a permanent magnet, the control device comprising:
a detector to detect a rotational position of the rotor at every predetermined angle and to output a position signal indicating the detected rotational position;
a calculator to calculate a period at which the detector outputs the position signal based on a predetermined rotation rate of the rotor; and
a controller to receive the position signal output by the detector and to adjust a duty ratio of a driving signal of the rotor by a pulse width modulation scheme based on the received position signal to control rotation of the rotor; wherein
the controller is configured or programmed to, if no position signal next to the position signal is received until a time interval to receive the position signal, which is based on the period calculated by the calculator, elapses from the reception of the position signal, raise the duty ratio from a first duty ratio until the next position signal is received, and to return the raised duty ratio to the first duty ratio when the next position signal has been received.

3. The control device according to claim 1, wherein the controller is configured or programmed to gradually raise the duty ratio from the first duty ratio.

4. The control device according to claim 1, wherein a varying waveform of the duty ratio from when the controller raises the duty ratio from the first duty ratio to when the controller returns the raised duty ratio to the first duty ratio has a maximum value at a point in time that is closer to when the raised duty ratio returns to the first duty ratio than to when the duty ratio begins to be raised from the first duty ratio.

5. The control device according to claim 4, wherein a waveform of the duty ratio adjusted by the controller is a sawtooth waveform including a plurality of the varying waveforms.

6. The control device according to claim 1, wherein the detector includes a magnetic sensor.

7. The control device according to claim 6, wherein the magnetic sensor is a Hall element.

8. The control device according to claim 7, wherein the position signal output by the detector including the Hall element is a set of position signals including a plurality of signals.

9. The control device according to claim 6, wherein the magnetic sensor is a magnetoresistive element.

10. The control device according to claim 6, wherein a number of times n that the detector outputs the position signal during one rotation of the rotor is a number of the magnetic sensors multiplied by a number of magnetic poles detected by the magnetic sensors.

11. The control device according to claim 10, wherein the number of magnetic poles detected by the magnetic sensors is greater than the number of magnetic poles of the permanent magnet.

12. The control device according to claim 10, wherein the number of times n is equal to or greater than a least common multiple of the number of magnetic poles of the permanent magnet and a number of teeth of the stator.

13. The control device according to claim 1, wherein the detector includes an optical encoder.

14. The control device according to claim 1, wherein the detector includes a resolver.

15. The control device according to claim 13, wherein a number of times n that the detector outputs the position signal during one rotation of the rotor is equal to or greater than a least common multiple of a number of magnetic poles of the permanent magnet and a number of teeth of the stator.

16. A control method for controlling, by a control device, a motor including a stator that includes a coil and a rotor including a permanent magnet, the control method comprising:
   receiving, by the control device, a position signal indicating a rotational position of the rotor;
   raising a duty ratio of a driving signal of the rotor to a first duty ratio by a pulse width modulation scheme until a predetermined time interval elapses since the reception of the position signal; and
   returning the raised duty ratio to the first duty ratio by the pulse width modulation scheme starting immediately after the predetermined time interval has elapsed.

17. A motor that is controlled by the control device according to claim 1.

18. An electric oil pump comprising a pump unit and the motor according to claim 17 to drive the pump unit.

19. The electric oil pump according to claim 18, wherein the pump unit is a volumetric pump to suck and discharge oil by changing an internal volume.

20. The electric oil pump according to claim 19, wherein the pump unit is a diaphragm pump to change an internal volume by a reciprocating motion of a diaphragm or a gear pump to change an internal volume by a rotational motion of a gear.

* * * * *